(12) United States Patent
Ponzio et al.

(10) Patent No.: US 11,557,946 B2
(45) Date of Patent: Jan. 17, 2023

(54) METHOD FOR INSERTING UNDULATED COIL ASSEMBLIES IN SLOTS OF CORES OF DYNAMOELECTRIC MACHINES

(71) Applicant: ATOP S.P.A., Barberino Val d'Elsa (IT)

(72) Inventors: Massimo Ponzio, Tavarnelle Val di Pesa (IT); Rubino Corbinelli, Poggibonsi (IT); Federico Rossi, Viterbo (IT)

(73) Assignee: ATOP S.P.A., Barberino Val d'Elsa (IT)

( * ) Notice: Subject to any disclaimer, the term of this patent is extended or adjusted under 35 U.S.C. 154(b) by 483 days.

(21) Appl. No.: 15/746,365

(22) PCT Filed: Jul. 8, 2016

(86) PCT No.: PCT/IB2016/054104
§ 371 (c)(1),
(2) Date: Jan. 19, 2018

(87) PCT Pub. No.: WO2017/013523
PCT Pub. Date: Jan. 26, 2017

(65) Prior Publication Data
US 2018/0233999 A1 Aug. 16, 2018

(30) Foreign Application Priority Data
Jul. 20, 2015 (IT) .................. 102015000035955

(51) Int. Cl.
*H02K 15/02* (2006.01)
*H02K 15/06* (2006.01)
(Continued)

(52) U.S. Cl.
CPC ............. *H02K 15/066* (2013.01); *H02K 3/12* (2013.01); *H02K 15/024* (2013.01);
(Continued)

(58) Field of Classification Search
CPC ........ Y10T 29/53143; Y10T 29/49073; H02K 15/024; H02K 15/0414; H02K 15/0428;
(Continued)

(56) References Cited

U.S. PATENT DOCUMENTS

| 2,476,744 A | 7/1949 | Leece |
| 3,543,337 A | 12/1970 | Meyn |

(Continued)

FOREIGN PATENT DOCUMENTS

| DE | 112011100868 T5 | 12/2012 |
| EP | 1 041 696 A1 | 10/2000 |

(Continued)

OTHER PUBLICATIONS

International Preliminary Report on Patentability dated Sep. 10, 2013 for International Application No. PCT/EP2012/000633.
(Continued)

*Primary Examiner* — A. Dexter Tugbang
(74) *Attorney, Agent, or Firm* — Cooley LLP

(57) ABSTRACT

Embodiments of the currently claimed disclosure are directed to methods for inserting an undulated coil assembly in the slots of a hollow core of a dynamoelectric machine. In some embodiments, the method can include positioning at least a first coil portion of the coil assembly around a support member, aligning a guide device with respect to end faces and the slots of the core, feeding the first coil portion from the drum support member along the guide device to insert adjacent superimposed linear portions (LI) of the coil assembly in the slots, engaging the superimposed linear portions (LI) along at least one guide surface during the feeding, and relatively moving the core with respect to the guide assembly device to position the slots for receiving the superimposed linear portions (LI).

9 Claims, 5 Drawing Sheets

(51) Int. Cl.
*H02K 15/04* (2006.01)
*H02K 3/12* (2006.01)
(52) U.S. Cl.
CPC ..... *H02K 15/0414* (2013.01); *H02K 15/0428* (2013.01); *H02K 15/064* (2013.01); *H02K 15/0421* (2013.01); *Y10T 29/49073* (2015.01); *Y10T 29/53143* (2015.01)
(58) Field of Classification Search
CPC ...... H02K 15/064; H02K 15/066; H02K 3/12; H02K 15/0421
See application file for complete search history.

(56) References Cited

U.S. PATENT DOCUMENTS

| | | | |
|---|---|---|---|
| 3,631,591 | A | 1/1972 | Eminger |
| 3,689,976 | A | 9/1972 | Donovan |
| 4,052,783 | A | 10/1977 | Shively |
| 4,727,742 | A | 3/1988 | Weaver |
| 4,750,258 | A | 6/1988 | Anderson |
| 4,901,433 | A | 2/1990 | Barrera |
| 5,586,384 | A | 12/1996 | Newman |
| 5,619,787 | A | 4/1997 | Couture et al. |
| 6,140,735 | A | 10/2000 | Kato et al. |
| 6,208,060 | B1 | 3/2001 | Kusase et al. |
| 6,339,871 | B1* | 1/2002 | Maesoba ........... Y10T 29/53143 29/596 |
| 6,376,961 | B2 | 4/2002 | Murakami et al. |
| 6,389,678 | B1 | 5/2002 | Ackermann et al. |
| 6,640,416 | B1 | 11/2003 | Sadiku |
| 6,641,416 | B2 | 11/2003 | Schulz et al. |
| 6,782,600 | B2 | 8/2004 | Yamazaki et al. |
| 7,210,215 | B2* | 5/2007 | Kato ................. H02K 15/0414 29/596 |
| 7,275,299 | B2 | 10/2007 | Kuroyanagi et al. |
| 7,370,401 | B2 | 5/2008 | Stratico et al. |
| 7,480,987 | B1 | 1/2009 | Guercioni |
| 7,624,493 | B2 | 12/2009 | Hirota et al. |
| 7,730,401 | B2 | 6/2010 | Gillespie et al. |
| 7,941,910 | B2 | 5/2011 | Guercioni |
| 8,215,000 | B2 | 7/2012 | Guercioni |
| 8,296,926 | B2 | 10/2012 | Wang et al. |
| 8,424,792 | B2 | 4/2013 | Ponzio et al. |
| 8,555,694 | B2 | 10/2013 | Saito et al. |
| 8,607,436 | B2 | 12/2013 | Ponzio et al. |
| 8,667,666 | B2 | 3/2014 | Sadiku et al. |
| 8,826,513 | B2 | 9/2014 | Guercioni |
| 8,918,986 | B2 | 12/2014 | Guercioni |
| 8,922,078 | B2 | 12/2014 | Guercioni |
| 9,300,193 | B2 | 3/2016 | Guercioni |
| 9,455,614 | B2 | 9/2016 | Corbinelli et al. |
| 9,467,029 | B2 | 10/2016 | Ponzio et al. |
| 9,479,033 | B2 | 10/2016 | Ponzio et al. |
| 9,520,762 | B2 | 12/2016 | Guercioni |
| 9,692,283 | B2 | 6/2017 | Ponzio et al. |
| 9,722,475 | B2 | 8/2017 | Niccolini et al. |
| 9,755,487 | B2 | 9/2017 | Ponzio et al. |
| 10,050,498 | B2 | 8/2018 | Ponzio et al. |
| 10,224,789 | B2 | 3/2019 | Corbinelli et al. |
| 10,305,354 | B2 | 5/2019 | Niccolini et al. |
| 10,411,570 | B2 | 9/2019 | Ponzio et al. |
| 10,749,418 | B2 | 8/2020 | Ponzio et al. |
| 2001/0007169 | A1 | 7/2001 | Takahashi et al. |
| 2002/0017585 | A1 | 2/2002 | Haruta et al. |
| 2002/0053126 | A1 | 5/2002 | Maeda et al. |
| 2002/0089250 | A1 | 7/2002 | Naka et al. |
| 2003/0137207 | A1 | 7/2003 | Tamura et al. |
| 2003/0159270 | A1 | 8/2003 | Kato |
| 2003/0233748 | A1 | 12/2003 | Gorohata et al. |
| 2004/0040142 | A1 | 3/2004 | Hirota et al. |
| 2005/0236509 | A1 | 10/2005 | Burch et al. |
| 2006/0001327 | A1 | 1/2006 | Ossenkopp et al. |
| 2006/0022547 | A1 | 2/2006 | Sadiku et al. |
| 2008/0148794 | A1 | 6/2008 | Patterson et al. |
| 2009/0233748 | A1 | 9/2009 | Boddy et al. |
| 2009/0249853 | A1 | 10/2009 | Young et al. |
| 2010/0325875 | A1 | 12/2010 | Ponzio et al. |
| 2013/0162072 | A1 | 6/2013 | Mizutani et al. |
| 2014/0007415 | A1* | 1/2014 | Corbinelli ......... H02K 15/0428 29/596 |
| 2014/0015366 | A1* | 1/2014 | Guercioni ......... H02K 15/0428 310/201 |
| 2014/0196282 | A1 | 7/2014 | Stephenson et al. |
| 2014/0300239 | A1 | 10/2014 | Takizawa et al. |
| 2016/0254733 | A1 | 9/2016 | Niccolini et al. |
| 2016/0365777 | A1 | 12/2016 | Corginelli et al. |
| 2017/0012511 | A1 | 1/2017 | Ponzio et al. |
| 2017/0302143 | A1 | 10/2017 | Niccolini et al. |
| 2020/0381983 | A1 | 12/2020 | Ponzio et al. |

FOREIGN PATENT DOCUMENTS

| | | | |
|---|---|---|---|
| EP | 1 041 702 | A2 | 10/2000 |
| EP | 1 043 828 | A2 | 10/2000 |
| EP | 1 061 635 | A2 | 12/2000 |
| EP | 1 304 789 | A1 | 4/2003 |
| EP | 1 324 463 | A2 | 7/2003 |
| EP | 1 328 059 | A2 | 7/2003 |
| EP | 1 372 242 | A2 | 12/2003 |
| EP | 1 376 816 | A2 | 1/2004 |
| EP | 1 710 896 | A1 | 10/2006 |
| EP | 1 727 260 | A2 | 11/2006 |
| EP | 1 043 828 | B1 | 9/2009 |
| FR | 2 845 536 | A1 | 4/2004 |
| FR | 2896351 | A1 | 7/2007 |
| FR | 2 968 858 | A1 | 6/2012 |
| GB | 6 447 61 | | 10/1950 |
| GB | 1 496 445 | | 12/1977 |
| JP | 2004072839 | A * | 3/2004 ......... H02K 15/0428 |
| WO | 2008108317 | A1 | 9/2008 |
| WO | WO 2011/004100 | A2 | 1/2011 |
| WO | WO 2012/119691 | A1 | 9/2012 |
| WO | WO 2012/156066 | A2 | 11/2012 |
| WO | WO 2013/190860 | A1 | 12/2013 |

OTHER PUBLICATIONS

International Preliminary Report on Patentability, dated Nov. 19, 2013, for International Application No. PCT/EP2012/002055.
International Search Report and Written Opinion dated Jan. 23, 2013 for International Application No. PCT/EP2012/002055.
International Search Report and Written Opinion, dated Apr. 5, 2012, for International Application No. PCT/EP2012/000633.
International Search Report and Written Opinion, dated Jul. 20, 2016 for International Application No. PCT/IB2016/052200.
International Search Report and Written Opinion, dated Jun. 19, 2015, for International Application No. PCT/EP2015/054254.
International Search Report and Written Opinion, dated May 4, 2015 for International Application No. PCT/EP2014/071226.
Search Report and Written Opinion completed Feb. 2, 2012 for IT TO2011A000435.
Search Report and Written Opinion completed Nov. 8, 2011 for IT TO2011A000199.
Search Report and Written Opinion, completed Jul. 28, 2014, for IT PI20130092.
Search Report for Italian Application No. IT 201700036222, completed Dec. 20, 2017, with English claims translation.
Search Report for Italian Patent Application No. PI2015000031, completed Jan. 14, 2016.
Search Report for Italian Patent Application No. PI2015000032, completed Jan. 15, 2016.
Search Report for Italian Patent Application No. PI2015000033, completed Jan. 18, 2016.
Search Report for Italian Patent Application No. PI2015000034, completed Feb. 1, 2016.

* cited by examiner

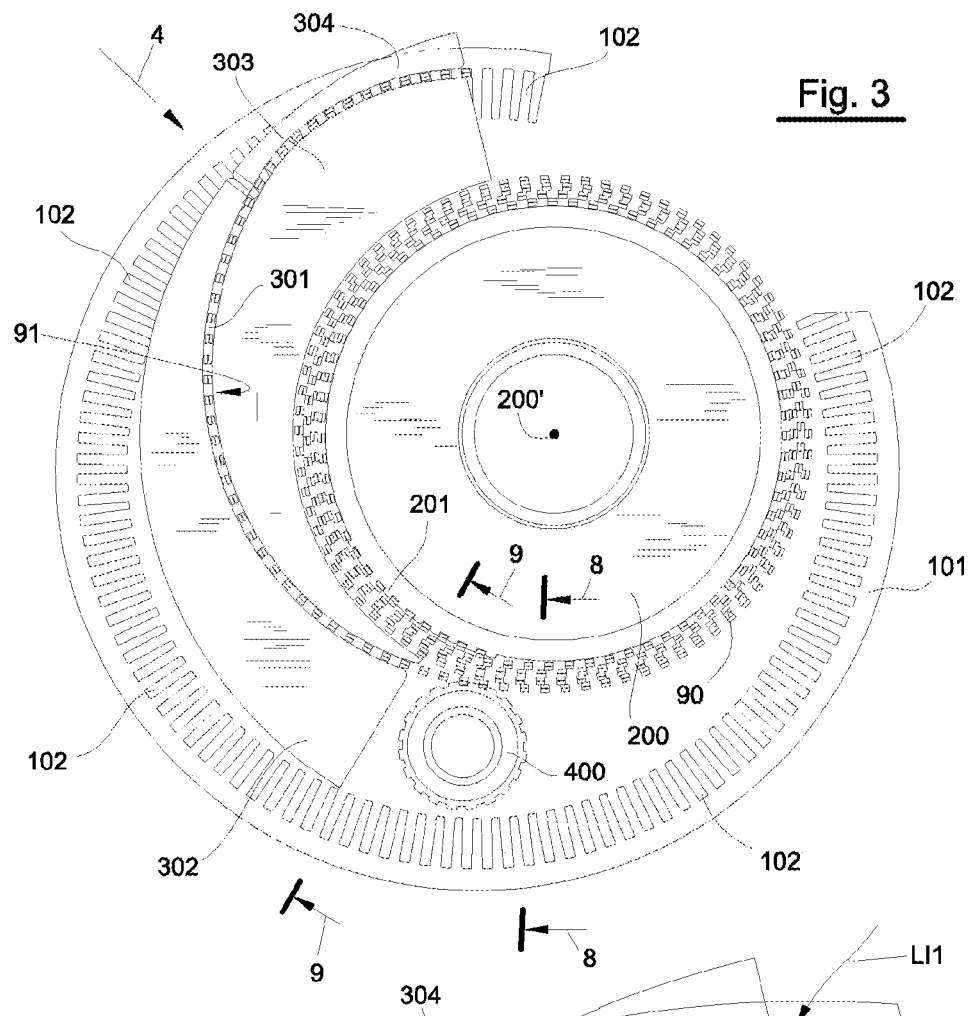
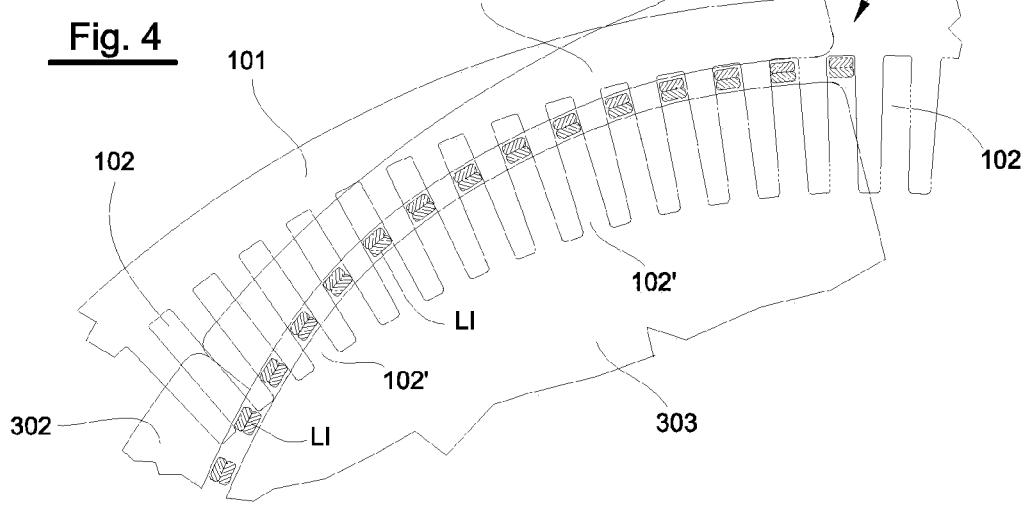

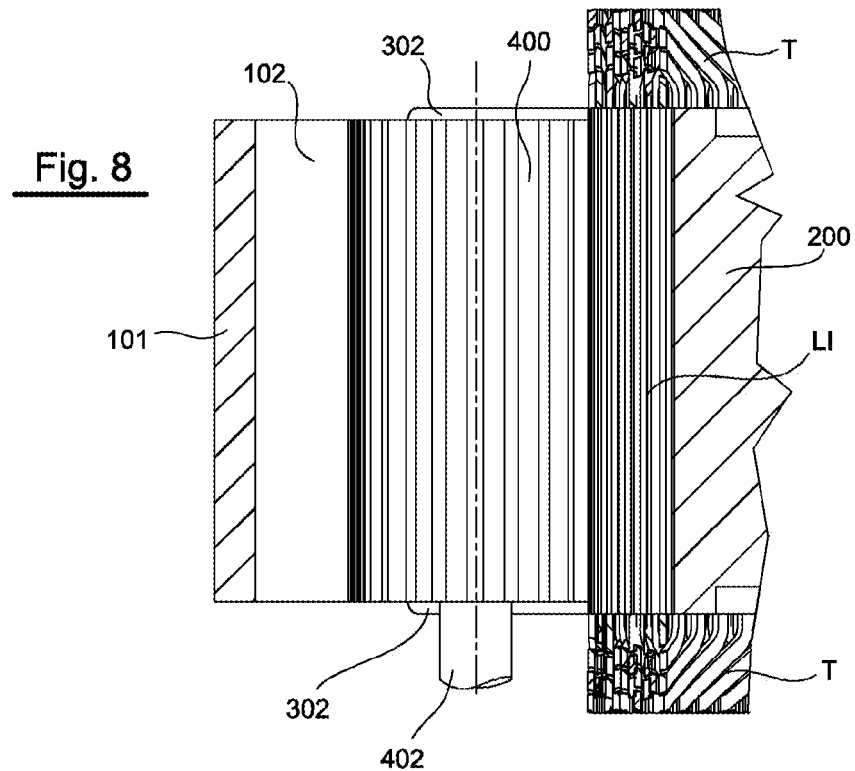
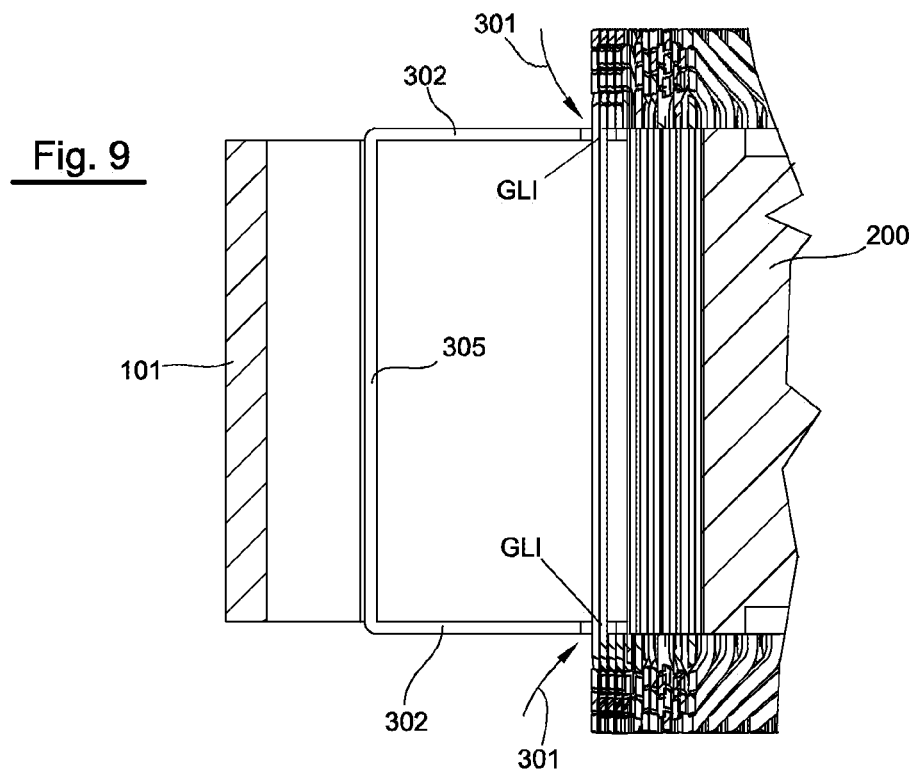

METHOD FOR INSERTING UNDULATED COIL ASSEMBLIES IN SLOTS OF CORES OF DYNAMOELECTRIC MACHINES

CROSS REFERENCE TO RELATED APPLICATIONS

This application claims priority to International Patent Application No. PCT/IB2016/054104, filed Jul. 8, 2016, which claims priority to Italian Patent Application No. 102015000035955, filed Jul. 20, 2015. The present application incorporates herein by reference the disclosures of each of the above-referenced applications in their entireties.

FIELD OF THE INVENTION

The present invention relates to a method and apparatus for inserting conductor coils in cores of dynamoelectric cores, particularly stator cores.

STATE OF THE ART

A coil, which is inserted, has adjacent linear portions extending parallel to each other, and a plurality of turn portions for connecting the adjacent linear portions with each other. The turn portions are alternately at one end side and at another other end side of the linear portions. The general form of the coil is normally designated undulated coil, or wave wound coil.

The linear portions are inserted in slots of a stator core, whilst the turn portions protrude from respective end sides of the stator core. The section of the conductor from which the coil is formed may be circular, square or rectangular. The size of the section of the conductor is usually comparable to the width of the slot section of the core. The cross sections of the conductors present in a slot are normally positioned one adjacent to another in a radial direction of the stator core, i.e. along a radial extension of the core, which extends from a slot entrance to the bottom of the same slot.

For reasons of clarity, a coil formed from one conductor having the undulated configuration will be referred to as a coil. A number of coils having the aforementioned configuration, and which are assembled together will be referred to as a coil assembly.

A particular case can be that of the coil assembly formed according to a woven configuration.

When examining a conductor of the coil assembly formed according to a woven configuration, the linear portions are positioned alternatively above and below the linear portions of another conductor along the coil assembly. The positioning of this superposition for a same conductor is repeated at a predetermined distance for a certain number of undulations. The turn portions joining these linear portions are positioned to be partially above and partially below turn portions of the other coils.

Solutions for producing woven coil assemblies of undulated coils have been described in U.S. Pat. No. 8,122,593, U.S. Pat. No. 6,376,961 and Italian application PI 2015A000031.

A non woven or layered flat coil assembly consists of a certain number of undulated coils each formed from a respective conductor and having a same pitch distance separating the linear portions. Therefore, a layered flat coil assembly consists of a number of single flat coils having linear portions that are adjacent to each other connected by turn portions.

The single flat coils are layered one on top of the other by superimposing linear portions one on top of the other, although one coil, which is immediately above another coil, will have linear portions shifted by the common pitch distance separating the adjacent linear portions. The result is a layered coil assembly having a multiple number of two superimposed linear portions like in the woven configuration, but with the turn portions simply superimposed. External leads of the layered assembly can connect one coil to another of the layers in order to achieve a required electric scheme that is equivalent to the scheme of the woven configuration.

Stator cores wound according to these principles can be used in dynamoelectric machines; in particular to act as traction motors and energy generators for vehicles.

The linear portions of the woven or layered coil assemblies will be superimposed to be seated in a same slot of the core, whilst the turn portions will be partially superimposed according to a certain progression, and remain positioned at the ends of the stator core, outside the slots.

Normally, a compression is required on the flat coil assembly to reduce the overall thickness. Prior to the compression, the linear portions, and the turn portions need to be positioned extremely precisely in view of the low allowable tolerances that exist during the successive insertion operations in the core.

A traditional principle of inserting the coil assembly is to transfer the flat coil onto a cylindrical arbor, where seats are present for positioning the linear portions in the angular positions matching the angular position where the linear portions need to be inserted. Pushing members of the arbor push the linear portions into aligned slots of the core by moving along radial directions corresponding to specific angular positions where the linear portions need to be located in the slots. A solution according to these principles is described in U.S. Pat. No. 7,367,106.

This type of insertion maintains the cross sections of the superimposed linear portions at a constant angle with respect to the radial insertion direction. Accordingly, the orientation of the cross section remains at a zero angle with respect to the radial direction of the core.

The zero angle requires that pitch distance separating adjacent superimposed linear portions be the same as the angular distance separating the entrance of adjacent slots, otherwise the superimposed linear portions are not aligned with the entrances of the slots, with the consequence that the superimposed linear portions cannot be inserted.

Considering that during the insertion, the superimposed linear portions need to move from an internal diameter circumference corresponding to the slot entrances to a more external diameter circumference corresponding to the final position of the superimposed linear portions. In this situation, the insertion of the superimposed linear portions having the pitch distance equal to the distance separating the entrances has the effect of straining the relative conductors and pulling the turn portions towards the faces of the stator core when the linear portions are moved along the radial distance of the slots. These effects increase for superimposed linear portions, which are positioned on a more external diameter circumference of the slots, i.e. are positioned at greater radial distances of the slots.

Documents US 2014/0196282 and FR 2896351 describe solutions for transferring undulated coils from a linear support having slots to a cylindrical support also having slots. The guide device of these documents does not change orientation of the linear portions of the undulated coils during the insertion of the coils in the slots.

Documents WO 2008/108317, U.S. Pat. No. 5,619,787 concern coil members, which are not undulated coils. The linear portions of the coils members change in orientation prior to, or during, insertion in the slots. The solutions of these documents are not applicable to insertion of the linear portions of undulated coils.

SUMMARY OF THE INVENTION

It is an object of the present invention to provide an improved method and apparatus for inserting undulated coil assemblies in the slots of cores of dynamo electric machines.

It is also an object of the present invention to provide a core of a dynamo electric machine wound with undulated coil assemblies, where the pitch distance between adjacent superimposed linear portion varies depending on the radial position that the superimposed linear position have within the slots of the core.

These and other objects are achieved using the method and the apparatus for forming woven coils as described in the independent claims.

Other characteristics of the inventions are described in the dependent claims.

BRIEF DESCRIPTION OF THE DRAWINGS

The invention will be now shown with the following description of an exemplary embodiment, exemplifying but not limitative, with reference to the attached drawings in which:

FIG. 3 is a view as seen from directions 3 of FIG. 2;

FIG. 4 is an enlarged view of area 4 of FIG. 3 with certain parts that are transparent for reasons of clarity;

FIG. 8 is a partial section view as seen from direction 8-8 of FIG. 3;

FIG. 9 is a partial section view as seen from direction 9-9 of FIG. 3.

DETAILED DESCRIPTION OF THE INVENTION

Figure 1:
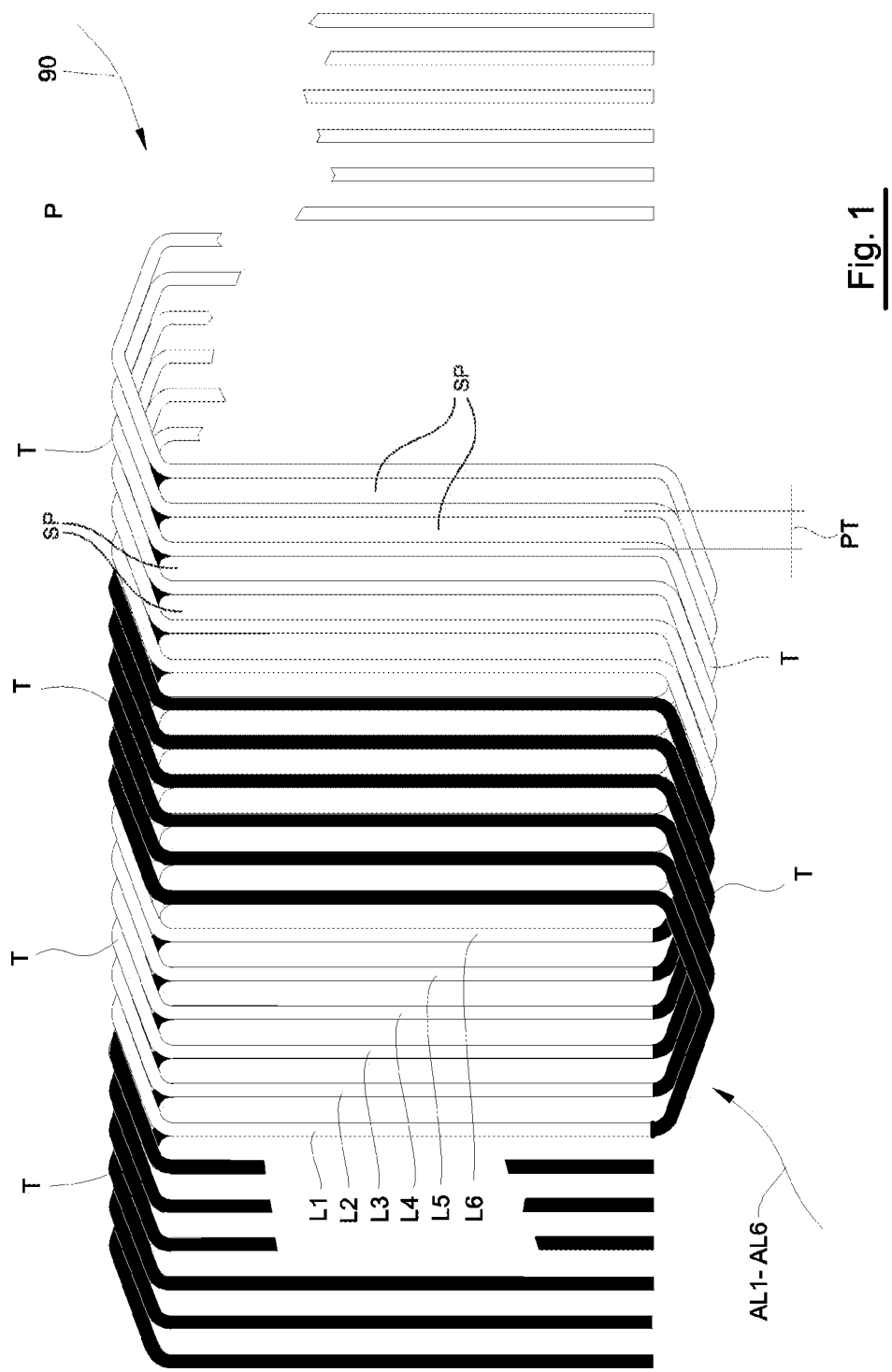
FIG. 1 is a planar view of a woven coil assembly.

A portion of an undulated woven coil assembly 90 consisting of twelve wire conductors is shown in FIG. 1. Coil assembly 90 is a flat coil assembly parallel to the plane P of the drawing of FIG. 1. The coil assembly 90 of FIG. 1 can be considered to be an interlacing of coil portions. More particularly, the coil assembly consists of a repetition of areas of six linear portions L1-L6 of coil superimposed on six linear portions AL1-AL6. Consequently two superimposed linear portions are at a pitch distance PT from two adjacent linear portions, as shown in FIG. 1.

A coil assembly according to these characteristics, together with methods and devices for achieving the flat configuration shown in FIG. 1, have been described in Italian Patent Application No. PI2015A000031.

Figure 2:
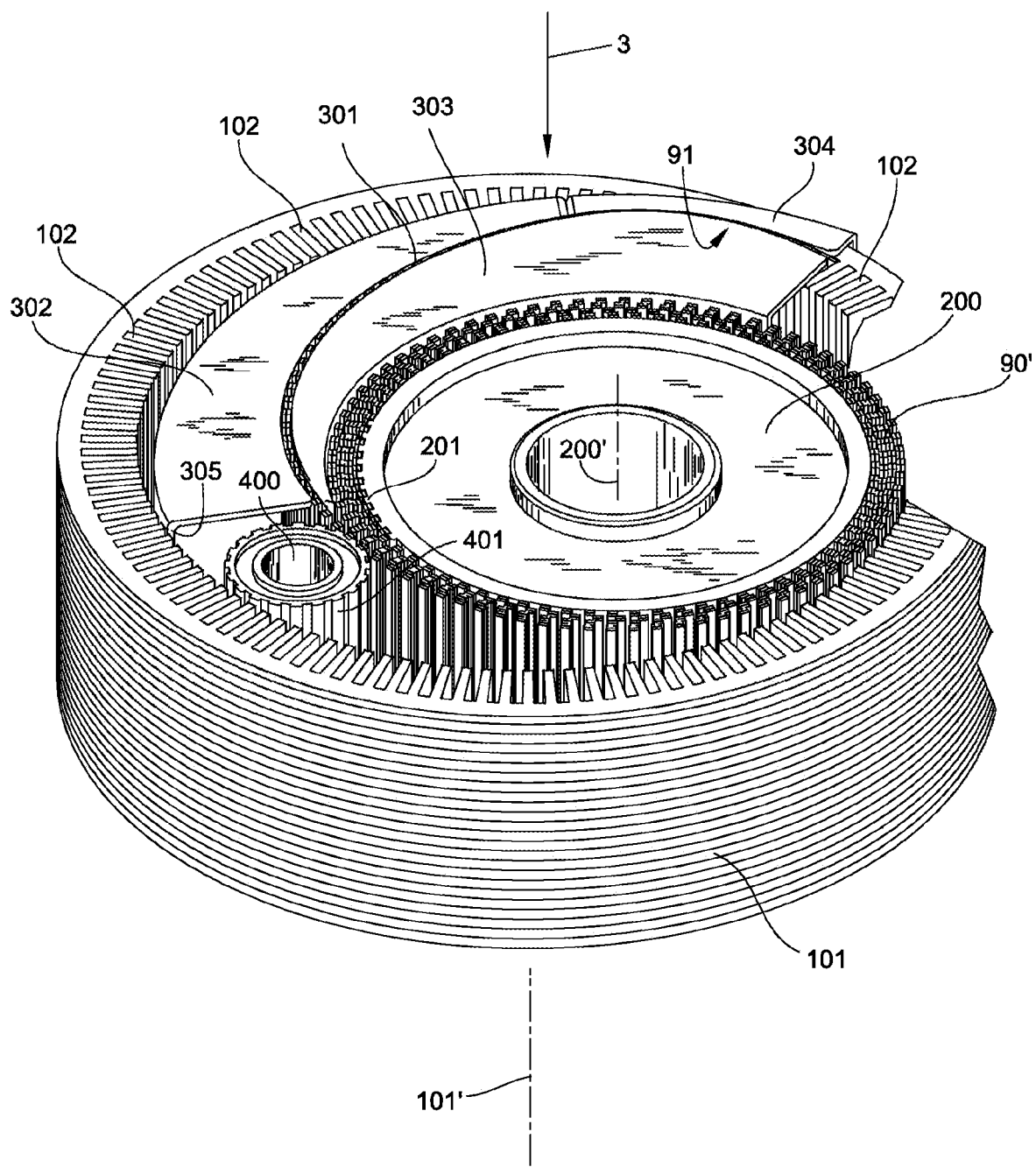
FIG. 2 is a schematic perspective view illustrating devices of the invention required for inserting coil assemblies according to the invention.
Figure 7:
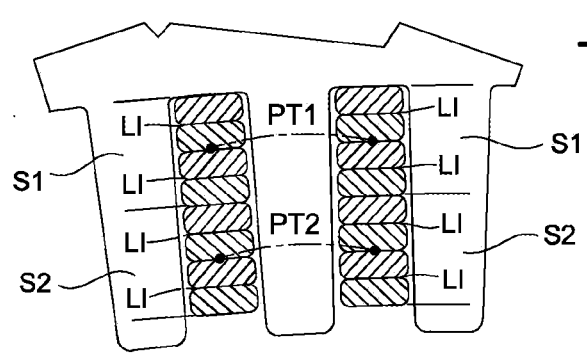
FIG. 7 is an enlarged partial view similar to that of FIG. 3 illustrating two adjacent slots of a core that have been filled.

A stator core 101, which receives the coil assembly of FIG. 1 is shown in FIGS. 2 and 3. The stator core will have a number of slots 102 proportional to the total number of superimposed linear portions LI. This total includes the linear portions of superimposed initial and final leads. As a result, in a slot 102, two superimposed linear portions LI can be accommodated on two other superimposed linear portions LI, which can be accommodated on other two superimposed linear portions LI, as shown in FIG. 7. Two superimposed linear portions are for example like linear portion L1 superimposed on linear portion AL1, or like linear portion L2 superimposed on linear portion AL2 of FIG. 1. This will depend on the number of superimposed linear portions LI present in the coil assembly, which has been formed. The example of FIG. 7 shows the case where a slot contains 4 pairs of superimposed linear portions LI, which corresponds to 8 conductors present in a slot 102. In the following, the terminology linear portions LI, when referred to the object being inserted, will mean two superimposed linear portions, like has been described in the foregoing. These two superimposed linear portions need to be inserted in a same slot 102.

Figure 5:
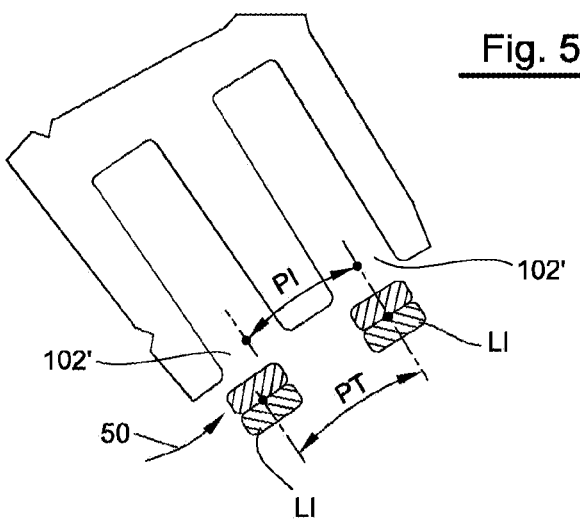
FIG. 5 is an enlarged partial view similar to that of FIG. 3 of two adjacent slots of a core.

With reference to FIG. 5, according to the invention linear portions LI, which are in adjacent slots, will be separated by a pitch distance PT, which is greater than the pitch distance PI which separates the entrances of the slots 102'. In this situation, at least linear portions 50 will not be sufficiently aligned with the entrance of slot 102', and therefore will not be able to enter slot 102'

Figure 6:
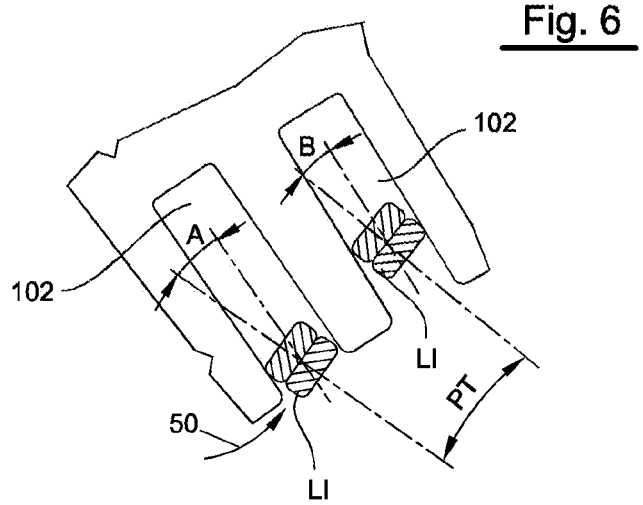
FIG. 6 is an enlarged partial view similar to that of FIG. 3 of two adjacent slots of a core during insertions steps according to the invention.

FIG. 6 shows instances of insertion of adjacent linear portions according to the principles of the invention. The adjacent linear portions have been rotated by angles A and B with respect to the radial directions of the slots 102. More particularly, at the instant of entering the slots 102 the angle will be A, whilst when the linear portion is further within the slots, the angle is B, which is smaller with respect to angle A. During the insertion according to these principles, the pitch distance PT between the adjacent linear portions LI remains constant.

As shown in the example of FIG. 7, according to the invention a predetermined number of linear portions LI positioned at or near to the bottom of the slots 102 will be wound and inserted having a pitch distance PT1, and a predetermined number of linear portions LI positioned at or near to the entrance of the slots will be wound and inserted having a pitch distance PT2.

In other words a certain set S1 of linear portions LI will have pitch distance PT1 and a second set S2 of linear portions LI will have pitch distance PT2, depending on the position that the linear portions LI have along the radius of the slots 102, as shown in FIG. 7.

Pitch distance PT1 will be larger than pitch distance PT2. This will result in the length of the turns T of the linear portions LI having the pitch distance PT1 longer than the length of the turns of the linear portions having the pitch distance PT2.

In this way, both the turns T of the linear portions will be more accurately positioned and tensioned. Accordingly, the stator core will have less height where the turns T are located, which achieves that the stator core 101 is more compact. Furthermore, there is an optimization of the length of conductor used to wind the coils of the stator core. Also, there is less variance in the electrical resistance of the coils, and the insulation of the conductors forming the coil assemblies is less subject to having areas of breakage.

FIGS. 2 and 3 illustrate a device of the invention, where a portion 90' of a flat coil 90 like that of FIG. 1, or a layered coil assembly, can be wound for a certain number of turns on a drum 200.

Drum 200 is provided with teeth 201 for engaging the tail end of the flat coil. By rotating drum 200 around longitudinal axis 200' of the drum, coil portion 90' unwinds from drum 200. In FIGS. 2 and 3, for reasons of clarity, turn portions T of the coil have been removed, although the turn portions T are visible in section views of FIGS. 8 and 9.

The leading portion 91 of coil 90 is directed through passage 301 of guide assembly 300. Passage 301 is delimited by guide plates 302, 303, 304.

Engagement wheel 400 is provided with teeth 401 for engaging the spacing SP existing between linear portions LI, as shown in FIGS. 2, 3 and 8. Rotation of engagement wheel 400 will feed the leading portion 91 of the flat coil through passage 301.

When engagement wheel 400 is being rotated, also drum 200 will be rotated to feed the leading portion 91 and unwind the rest of the coil portion 90' from drum 200 without modifying the pitch distance PT existing between the linear portions LI.

At the same time, stator core 101 is indexed by a rotation motion around longitudinal axis 101', which is the central longitudinal axis of the stator core 101, as shown in FIGS. 2 and 3.

With reference also to FIG. 4, rotation of drum 200, together with rotation of engagement wheel 400 and rotation of stator core 101 align each linear portion LI of the flat coil with a specific slot 102, where the linear portion LI needs to be inserted though the entrance 102', and thereafter positioned in the depth of a specific slot 102.

FIG. 4 illustrates how the configuration of the guide passage 301 and the described movements of the drum 200, the engagement wheel 400 and the stator core 101 progressively insert the linear portions LI in the respective slots 102, and position the linear portions at the required depth within the slots 102.

More particularly, engagement of the linear portions along the sides of the guide passage 301 during the above movements rotates, or orients, the linear portions LI, as has been described with reference to FIGS. 4 and 6, to insert the linear portions through the entrance 102' of the slots 102, and to continue to rotate, or orient, the linear portions at predetermined positions inside the slots 102. At all times of the rotation, or orientations, the pitch distance PT between linear portions LI remains constant, as shown in FIG. 6.

As shown in FIG. 4, and with reference to FIG. 6, during the described movements, angle A gradually reduces as the linear portions LI move within the slots by movement along passage 301 until the angle becomes zero when a linear portion leaves passage 301, and results positioned at a required final position within a slot 102 (see linear portions LI1 in FIG. 4).

The situation of FIG. 4 is the initial stage of the insertion of the flat coil, in which the linear portions become positioned at the bottom of the slots 102.

To obtain the insertion of a plurality of linear portions in a same slot, like is shown in FIG. 7, multiple synchronized 360° rotations of drum 200 and stator core 101 need to be accomplished. The number of these rotations depends on the number of linear portions of the flat coil, which need to be inserted in a same slot. Guide plate 304 needs to be separate from guide plate 302, so that plate 304 can be removed, when practically a full rotation of the stator core has occurred. In fact, in the final stage of a complete rotation of the stator, guide plate 304 will be occupying the place where successive turns of linear portions need to be inserted, as can be deduced from FIG. 4.

With reference to FIGS. 8 and 9 the guide plates 302, 303, 304 are duplicated on the opposite side of the stator core, so that the linear portions LI are guided by two aligned passages 301 to be parallel to the entrance of the slots, where the linear portion need to be inserted.

Structure 305 located in the stator core can be adopted for connecting the guide plates, as shown in FIGS. 2 and 9.

As shown in FIGS. 8 and 9, passages 301 can guide portions GL1 of linear portions LI. Guide portions GL1 can be at the ends of linear portions LI, and adjacent to turn portions T, as shown in FIG. 9.

A drive unit (not shown) is attached to shaft 402 of engagement wheel 400 for the rotation of guide wheel 400, as shown in FIG. 8.

In order to place all the linear portions LI in the slots 102, linear portions LI having different pitch distance PT2, as shown in FIG. 7, need to be in inserted in the part of the slot that is nearer to the entrance.

This can be achieved by winding a second flat coil to have pitch distance PT2. The second flat coil can be wound around another drum like 200 having teeth at a pitch distance PT2. Also, a second engagement wheel 400 will need to have a pitch distance PT2 between the teeth.

Furthermore, guide plates 302, 303 and 304 will need to form a passage having a configuration that progressively rotates, or orients the linear portions with specific angles for entering the slots and for maintaining pitch distance PT2 constant.

These different devices can be present in a second unit like that of FIG. 2, where the stator core 101 can be transferred and positioned for the successive insertion of the second flat coil having pitch distance PT2. This will avoid having to replace drum 200, engagement wheel 400, and guide plates 302, 303 and 304 in a single unit.

It will be appreciated that by means of device not shown the relative movement of the stator core 101 with respect to the guide passage 301 can be achieved with motions, which when combined together result in a rotation of the stator core around axis 101', or in other movements, which achieve the required insertion and final positioning in the slots 102 of the stator core.

It should also be appreciated that the passage 301 can be accomplished by means of a single guide surface along which the linear portions LI are caused to engage and move in order be rotated and inserted in the slots 102 of stator core 101, like occurs on guide surface of plate 303 when guide 304 is removed.

The foregoing description exemplary embodiments of the invention will so fully reveal the invention according to the conceptual point of view, so that others, by applying current knowledge, will be able to modify and/or adapt for various applications such embodiment without further research and without parting from the invention, and, accordingly, it is therefore to be understood that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. A method for inserting an undulated coil assembly in slots of a hollow core of a dynamoelectric machine, the coil assembly having adjacent superimposed linear portions (LI) extending parallel to each other and a plurality of turn portions (T) connecting the linear portions (LI), the method comprising the steps of:

positioning at least a first coil portion of the coil assembly along an outer curved surface of a support member comprising a drum;

aligning a guide device with respect to end faces and the slots of the core;

feeding the first coil portion from the outer curved surface of the support member along the guide device via rotation to insert the adjacent superimposed linear portions (LI) in the slots towards to the hollow core;

radially engaging the superimposed linear portions (LI) along at least one guide surface that forms a passage of the guide device during the feeding along the guide device to change an angular orientation of adjacent superimposed linear portions (LI) with respect to radiuses of the slots during the insertion in the slots; and relatively moving the core with respect to the guide device to position the slots for receiving the superimposed linear portions (LI).

2. The method of claim 1, further comprising:

engaging superimposed linear portions (LI) of a tail end of the first coil portion in slots of the support member;

engaging superimposed linear portions (LI) of the first coil portion with a feed member located between the support member and the slots; and synchronizing the movement of the support member, the movement of the feeding and the relative movement of the core.

3. The method of claim 1, wherein:

the positioning, the aligning, the feeding, and the relative moving of the core are repeated to orient and insert in the slots superimposed linear portions (LI) of at least a second coil portion of the coil assembly; and the second coil portion is provided with a different pitch distance (PT2) for separating the superimposed linear portions with respect to a pitch distance (PT1) for separating superimposed linear portions of the first coil portion.

4. A method for inserting an undulated coil assembly in slots of a hollow core of a dynamoelectric machine, the coil assembly having adjacent superimposed linear portions (LI) extending parallel to each other and a plurality of turn portions (T) connecting the linear portions (LI), the method comprising the steps of:

positioning at least a first coil portion of the coil assembly along an outer curved surface of a support member comprising a drum;

aligning a guide device with respect to end faces and the slots of the core;

feeding the first coil portion from the outer curved surface of the support member along the guide device via rotation to insert the adjacent superimposed linear portions (LI) in the slots towards to the hollow core;

engaging the superimposed linear portions (LI) along at least one guide surface that forms a passage of the guide device during the feeding along the guide device to change an angular orientation of adjacent superimposed linear portions (LI) with respect to radiuses of the slots during the insertion in the slots; and relatively moving the core with respect to the guide device to position the slots for receiving the superimposed linear portions (LI).

5. The method of claim 4, further comprising:

engaging superimposed linear portions (LI) of a tail end of the first coil portion in slots of the support member;

engaging superimposed linear portions (LI) of the first coil portion with a feed member located between the support member and the slots; and synchronizing the movement of the support member, the movement of the feeding and the relative movement of the core.

6. The method of claim 4, wherein:

the positioning, the aligning, the feeding, and the relative moving of the core are repeated to orient and insert in the slots superimposed linear portions (LI) of at least a second coil portion of the coil assembly; and the second coil portion is provided with a different pitch distance (PT2) for separating the superimposed linear portions with respect to a pitch distance (PT1) for separating superimposed linear portions of the first coil portion.

7. The method of claim 4, wherein an angle of the angular orientation is reduced during the insertion in the slots.

8. A method for inserting an undulated coil assembly in slots of a hollow core of a dynamoelectric machine, the coil assembly having adjacent superimposed linear portions (LI) extending parallel to each other and a plurality of turn portions (T) connecting the linear portions (LI), the method comprising the steps of:

positioning at least a first coil portion of the coil assembly around a support member comprising a drum;

aligning a guide device with respect to end faces and the slots of the core;

feeding the first coil portion from the support member along the guide device via rotation to radially insert the adjacent superimposed linear portions (LI) in the slots toward the hollow core;

radially engaging the superimposed linear portions (LI) along at least one guide surface that forms a passage of the guide device during the feeding along the guide device to change an angular orientation of adjacent superimposed linear portions (LI) with respect to radiuses of the slots during the insertion in a direction of the radiuses of the slots; and relatively moving the core with respect to the guide device to position the slots for receiving the superimposed linear portions (LI).

9. A method for inserting an undulated coil assembly in slots of a hollow core of a dynamoelectric machine, the coil assembly having adjacent superimposed linear portions (LI) extending parallel to each other and a plurality of turn portions (T) connecting the linear portions (LI), the method comprising the steps of:

positioning at least a first coil portion of the coil assembly around a side, cylindrical surface of a support member comprising a drum;

aligning a guide device with respect to end faces and the slots of the core;

feeding the first coil portion from the support member along the guide device via rotation to radially insert the adjacent superimposed linear portions (LI) in the slots toward the hollow core;

engaging the superimposed linear portions (LI) along at least one guide surface that forms a passage of the guide device during the feeding along the guide device to change an angular orientation of adjacent superimposed linear portions (LI) with respect to radiuses of the slots during the insertion in a direction of the radiuses of the slots; and relatively moving the core with respect to the guide device to position the slots for receiving the superimposed linear portions (LI).

\* \* \* \* \*